US007264279B2

(12) United States Patent
Rich et al.

(10) Patent No.: US 7,264,279 B2
(45) Date of Patent: Sep. 4, 2007

(54) SEGMENTED CONDUIT HAVING A MONOLITHIC LINING

(75) Inventors: Joseph M. Rich, Jericho, VT (US); Jeffrey A. Goodwin, Jericho, VT (US); Robert J. Moore, II, Westford, VT (US)

(73) Assignee: Fab-Tech, Inc., Colchester, VT (US)

( * ) Notice: Subject to any disclaimer, the term of this patent is extended or adjusted under 35 U.S.C. 154(b) by 126 days.

(21) Appl. No.: 10/887,560

(22) Filed: Jul. 8, 2004

(65) Prior Publication Data
US 2006/0006646 A1    Jan. 12, 2006

(51) Int. Cl.
*F16L 13/02* (2006.01)
(52) U.S. Cl. .................... 285/21.1; 285/55; 285/285.1; 156/158; 156/304.2; 156/304.6
(58) Field of Classification Search ............. 285/288.4, 285/293.1, 285.1, 55, 21.1; 156/158, 304.2, 156/304.6, 309.6; 219/243, 221
See application file for complete search history.

(56) References Cited

U.S. PATENT DOCUMENTS

| | | | |
|---|---|---|---|
| 2,725,079 A | 11/1955 | Streed et al. | |
| 4,127,287 A | 11/1978 | Davies | |
| 4,281,859 A | 8/1981 | Davies | |
| 4,718,698 A * | 1/1988 | Hill | 285/21.2 |
| 4,883,292 A | 11/1989 | Kuroki | |
| 5,248,080 A | 9/1993 | Stapleton | |
| 5,730,472 A * | 3/1998 | Krause et al. | 285/21.1 |
| 6,840,545 B2 * | 1/2005 | Schulte-Ladbeck et al. | 285/21.1 |

* cited by examiner

*Primary Examiner*—Aaron Dunwoody
(74) *Attorney, Agent, or Firm*—Downs Rachlin Martin PLLC (57) ABSTRACT

A conduit (100) comprising a plurality of conduit segments (112A–112C) each having a body (120A–120C) and a segment lining (136A–136C) made of a lining material. Each body includes a joint face (132A–132C) having secured thereto a portion (140A–140C) of the corresponding segment lining. A monolithic lining (108) is formed from the segment linings by abutting the conduit segments with one another so that the joint faces face one another and the portions of the segment linings contact one another. The portions of the lining on the joint faces are heated to a temperature above the melting point of the lining material so that they fuse with one another so as to form a fusion (148A, 148B) located between the joint faces.

17 Claims, 4 Drawing Sheets

SEGMENTED CONDUIT HAVING A MONOLITHIC LINING

FIELD OF THE INVENTION

The present invention generally relates to the field of conveyance conduits. In particular, the present invention is directed to a segmented conduit having a monolithic lining.

BACKGROUND OF THE INVENTION

Many types of systems require one or more materials, e.g., gases, liquids, vapors, flowable particulates, etc., to be conveyed from one location to another, often within conduits, such as ducts and pipes. If the conveyed materials were innocuous to low-cost conduit materials, providing cost effective, durable conduit systems would be a simple matter. However, many conveyed materials have one or more characteristics that are detrimental to low-cost conduits. Therefore, materials that are resistant to the detrimental characteristics must be used to provide robust conveying systems. Examples of systems that carry materials detrimental to low-cost conduit materials include exhaust systems, e.g., microchip fabrication tool exhaust systems, fossil fuel power generation boiler flue gas exhaust systems, internal combustion engine exhaust systems, etc., and material supply and transfer systems, e.g., piping systems, for moving materials from one location to another for any of a variety of purposes.

In designing a conveyance system for a material having one or more detrimental characteristics, a designer generally has one or two options, depending upon the properties, e.g., strength, ductility, etc., of the material selected to resist the detrimental characteristic(s) of the conveyed material. For example, if the properties of the resistant material are such that an entire conduit can be constructed of that material, then the designer has the choice of either constructing the entire conduit out of the resistant material or constructing a large portion of the conduit out of a non-resistive material and utilizing the resistant material as a protective lining located between the conveyed material and the non-resistant material. The choice will often be driven by the cost and practicality of the resistant material. If the resistant material is relatively expensive, it may not be economical to construct an entire conduit out of that material. In this case, the designer would choose to only line the conduit with the resistant material. Of course, if the properties of the resistant material are such that the resistant material cannot practically be used to construct an entire conduit, e.g., the material is too weak, brittle or flexible, lining the conduit with the material may be the only way to provide the resistance needed. In addition, lined conduits are often desirable to provide fire-resistant conduit systems in which the conduits must maintain their structural integrity in the presence of unwanted fires within the conduits. In these cases, the lining materials resistant to the detrimental effect(s) of the conveyed material are typically flammable, so a fire-resistant material, such as steel, is used to support the lining and carry the structural loads imposed on, and by, the conduits.

An example of a system in which materials resistant to the detrimental effect(s) of conveyed materials are often utilized as linings is an exhaust system for a microelectronics chip material deposition tool, such as a chemical vapor deposition (CVD) apparatus. Over the years, a relatively efficient design has evolved for conduits, i.e., ducts, of such exhaust systems. Generally, this design is a lining-type design in which a fluoropolymer lining is applied to cylindrical duct segments each having a radial, outwardly turned flange at each end. Typically, the fluoropolymer lining is applied to the interior surfaces and the joint faces of the flanges using a conventional high-temperature bonding process. To form a run of duct, a plurality of duct segments are joined with one another by placing a gasket between the flanges of abutting duct segments and compressing the gasket between the flanges using one or more mechanical clamps. Other types of lined ducts are available, such as ducts made using flanged duct segments containing separate liners having turned-out ends that confront the joint faces of the flanges. Such a joint is shown in U.S. Pat. No. 4,127,287 to Davies. In this type of joint, the turned-out ends of the liner are compressed against one another between the flanges of abutting duct segments using mechanical clamps.

While the joints of these ducts have generally served the semiconductor fabrication and other industries relatively well, they are prone to leakage due to the inherent discontinuity in the linings of abutting duct segments. Leakage is particularly a problem when the mechanical clamp(s) work loose, e.g., due to vibration and other disturbances. What is needed are ducts, or more generally conduits, that may be installed or otherwise assembled in segments, but which have linings continuous across the joints between abutting segments.

SUMMARY OF THE INVENTION

In one aspect, the present invention is directed to a conduit comprising a first conduit segment that comprises a first body having a first interior surface and a first joint face. A first layer is secured to the first interior surface. A second conduit segment comprises a second body having a second interior surface and a second joint face facing the first joint face and spaced therefrom. A second layer is secured to the second interior surface. A fusion is located at least partially between the first joint face and the second joint face, the fusion being monolithic with each of the first layer and the second layer.

In another aspect, the present invention is directed to a method of making a conduit. The method comprises the step of providing a first conduit segment that includes a first joint face and a first layer secured to the first joint face. A second conduit segment that includes a second joint face and a second layer secured to the second joint face is provided. The first layer is contacted with the second layer so that the first joint face and the second joint faces face one another. At least a portion of the first layer and a portion of the second layer are heated so that the first layer and the second layer fuse with one another.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE DRAWINGS

Referring now to the drawings, FIGS. 1A–1D show in accordance with the present invention a conduit, which is generally identified by the numeral 100. Conduit 100 generally defines a passageway 104 that is typically configured for carrying, or conveying, a material (not shown) having one or more characteristics that are detrimental to conventional structural materials that, absent the detrimental property(ies) of the conveyed material, could be used to construct the entire conduit. Examples of conveyed materials are mentioned in the background section, above, and include, gases, liquids, flowable particulates, vapors, etc., or combinations thereof. Detrimental characteristics of these materials may include corrosiveness, abrasiveness and the ability to dissolve and leach components out of the affected material, among others. Consequently, conduit 100 may further include a monolithic lining 108 made of a material that is resistant relative to the detrimental characteristics of the conveyed material.

Figure 1A:
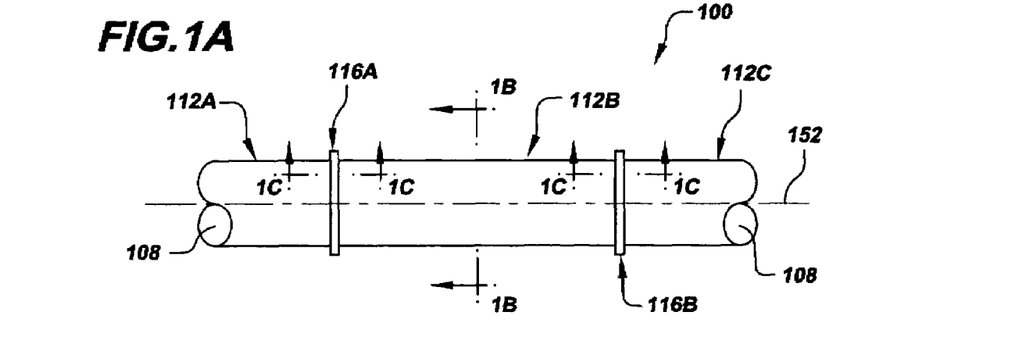
FIG. 1A is an elevational view of a conduit of the present invention.
Figure 1B:
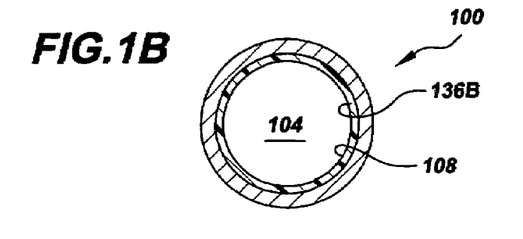
FIG. 1B is an enlarged cross-sectional view of the conduit of FIG. 1A as taken along the line 1B—1B.

Conduit 100 comprises a plurality of conduit segments, such as conduit segments 112A–112C, aligned, abutted and joined to one another at a correspondig number of joints, such as joints 116A, 116B. FIG. 1D illustrates conduit segments 112A, 112B and 112B, 112C of conduit 100 of FIG. 1A prior to being joined with one another. As seen in FIG. 1D, each conduit segment 112A, 112B and 112B, 112C may each comprise a body 120A–120C having an interior surface 124A–124C. Each body 120A–120C may include at least one flange 128A–128C having a joint face 132A–132C. A segment lining 136A, 136B, or layer, may be secured to corresponding joint faces 132A, 132B and interior surface 124A, 124B of bodies 120A, 120B. Each segment lining 136A–136C may be secured to the corresponding body 120A–120C in any number of manners, depending upon the material used. As discussed in detail below, conduit segments 112A, 112B (and 112B, 112C) are joined to one another by heating the portions 140A–140C of segment linings 136A–136C on the respective joint faces 132A–132C so as to cause these portions at to at least partially melt and fuse to one another and essentially form monolithic lining 108 of assembled conduit 100 of FIGS. 1A–1C.

The material selected for segment linings 136A–136C will typically be a material capable of melting and fusing with itself, or a similar material if the materials of the two segment linings are different from one another, at a temperature lower than the melting temperature of bodies 120A–120C, so that flanges 128A–128C and adjacent regions of the bodies maintain their integrity. Examples of such materials include thermoplastics and metals. That said, it is recognized that there may be some materials suitable for segment linings 136A–136C that have a melting point the same as or higher than the material used for bodies 120A–120C, but can be heated in a way that avoids melting of the body material. Similarly, the materials that may be used for bodies 120A–120C may vary greatly and include metals, ceramics, thermoplastics and thermosetting plastics, among others. It is noted that bodies 120A–120C and segment linings 136A–136C may both be made of the same material type, e.g., both thermoplastics or both metals.

In one embodiment, each segment lining 136A–136C may be made of a fluoropolymer, such as ethylene tetrafluoroethylene (ETFE), polytetrafluoroethylene (PTFE), ethylene chlorotrifluoroethylene (ECTFE) and perfluroalkoxy (PFA), among others. As mentioned, fluoropolymers may be suitable for some applications, such as CVD exhausting. When segment linings 136A–136C comprise a fluoropolymer and conduit 100 must be designed to span reasonable lengths, a designer may make bodies 120A–120C out of a relatively inexpensive metal, such as stainless steel, carbon steel or aluminum, to name just a few. Prior to joining conduit segments 112A–112C with one another, the fluoropolymer may be secured to bodies 120A–120C using well-known techniques so as to form segment linings 136A–136C. For example, when segment linings 136A–136C are made of ETFE, a suitable primer 144 may first be applied to interior surfaces 124A–124C and joint faces 132A–132C of bodies 120A–120C in order to effect a good bond between the bodies and linings, and the ETFE is applied over the primer using a suitable technique, such as an electrostatic/baking technique. Using such a technique, segment linings 136A–136C become well bonded to the respective bodies 120A–120C. This example is described in more detail below.

As those skilled in the art will readily appreciate, the variety of materials that can be used for segment linings 136A–136C and bodies 120A–120C is relatively very large. Those skilled in the art will appreciate that the selection of materials for bodies 120A–120C and segment linings 136A–136C will be based upon service conditions of conduit 100. Since service conditions will vary widely depending upon the application of conduit 100, it is not practical to provide an exhaustive list of all of the materials that may be used. However, those skilled in the art will be readily capable of selecting suitable materials for particular service conditions. In addition, those skilled in the art will also readily appreciate that the number of techniques that may be used to secure segment linings 136A–136C to the respective bodies 120A–120C is also relatively large. For example, suitable securing techniques include adhesive bonding, fusion bonding, explosive bonding, chemical bonding and brazing, among others. It is noted that, in addition to being made of any of a variety of materials, conduit segments 112A–112B may be configured in any closed or open transverse cross-sectional shape. For example, closed shapes, for conduits such as ducts and pipes, include circular, oval, rectangular, etc., and open shapes, for conduits such as troughs and open channels, include U-shapes, V-shapes, etc.

Figure 1C:
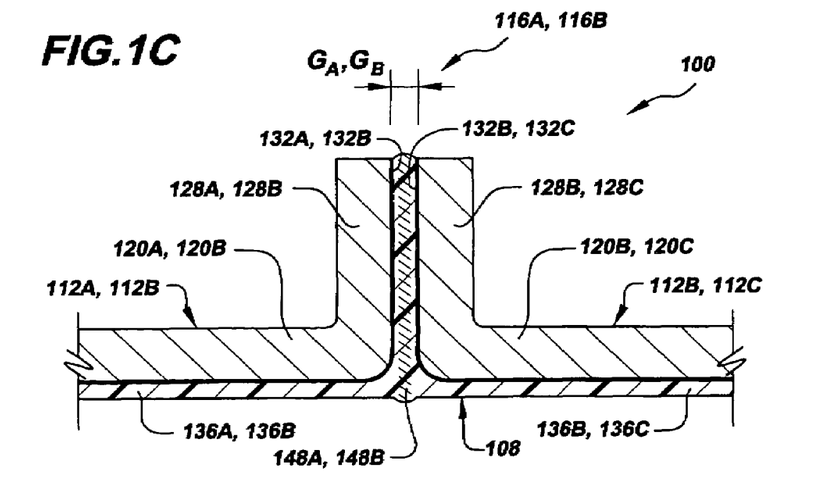
FIG. 1C is an enlarged cross-sectional view of the conduit of FIG. 1A as taken along the line 1C—1C.
Figure 1D:
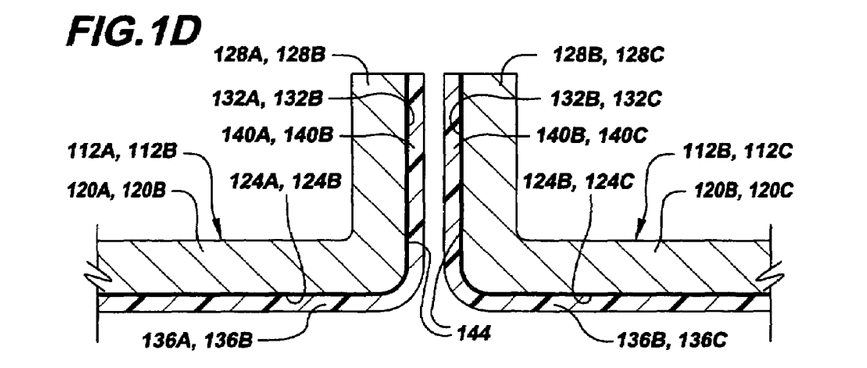
FIG. 1D is an enlarged cross-sectional view of adjacent conduit segments of the conduit of FIG. 1A prior to the segments being joined to one another.

Referring to FIG. 1C, and also to FIG. 1D, when portions 140A–140C of segment linings 136A–136C on joint faces 132A–132C are heated sufficiently and, optionally, pressed together as discussed in more detail below, the segment linings melt and at least partially fuse together so as to form a fusion 148A, 148B, as represented by forward hatching between the joint faces. Generally, fusion 148A of joint 116A comprises a commingling of molecules from segment lining 136A and segment lining 136B and fusion 148B of joint 116B comprises a commingling of molecules from segment lining 136B and segment lining 136C. Once the melted portions 140A–140C of segment linings 136A–136C and fusions 148A, 148B cool, the segment linings and fusions are joined as one to form, for practical purposes, monolithic lining 108. An important aspect of lining 108 being monolithic is that joints 116A, 116B between adjacent conduit segments 120A–120C are completely sealed by the continuity of the lining across the joints. When properly designed and executed, e.g., by selecting the proper materials, thicknesses of segment linings 136A–136C and spacing $S_A$, $S_B$ between joint faces 132A–132C, joints 116A, 116B can be strong enough to carry a relatively large amount of bending and axial loads so that supports (not shown) may be reasonably spaced from one another. This allows conduit 100 to be used effectively and efficiently in designing a system containing the conduit. Depending upon the fire resistance of monolithic lining 108 and the use of conduit 100, it may be desirable to provide joints 116A, 116B with clamps (not shown) or other mechanical securing means to inhibit the conduit from collapsing if the lining becomes too hot to carry the support loads between adjacent conduit segments 112A–112C. The design and execution processes are described below in more detail relative to certain fluoropolymers.

Those skilled in the art will appreciate that although annular joint faces 132A–132C are shown as being planar and perpendicular to the longitudinal axis 152, they may be non-planar, e.g., having complementary mating features, e.g., interdigitating fingers, and/or may form other angles relative to the longitudinal axis, e.g., joint faces may be complementarily frusto-conical in shape. The frusto-conical shape may be provided to aid the alignment of conduit segments 112A–112C prior to and/or during the fusion process.

Figure 2:
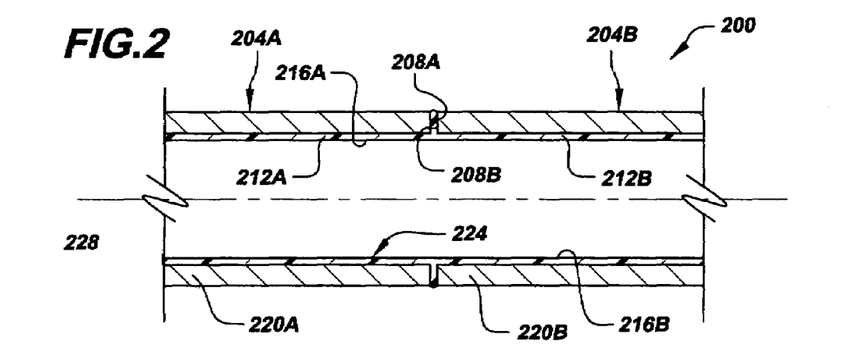
FIG. 2 is a longitudinal cross-sectional view of another embodiment of a conduit of the present invention.

Conduit segments 112A–112C may have ends configured in virtually any configuration that permits the conduit segments to be joined by the fusion process described above, i.e., the process that essentially forms monolithic lining 108 from separate segment linings 136A–136C by fusing the segment linings to one another. For example, FIG. 2 illustrates a portion of flangeless conduit 200 assembled from several conduit segments 204A, 204B each having annular joint faces 208A, 208B that face one another. Prior to assembly, segment linings 212A, 212B are secured to joint faces 208A, 208B and interior surfaces 216A, 216B of the respective bodies 220A, 220B. Then, conduit segments 204A, 204B are aligned and abutted to one another so that the portions of segment linings 212A, 212B on joint faces 208A, 208B contact one another. The contacting portions are then heated so as to cause them to melt and fuse together and form a monolithic lining 224. The materials of bodies 220A, 220B and segment linings 212A, 212B (and, therefore, monolithic lining 224), may be the same as described above in connection with conduit 100 of FIGS. 1A–1C. Again, the process of joining conduit segments 204A, 204B to one another is described below in more detail. Like joint faces 132A–132C of conduit segments 112A–112C of FIGS. 1C and 1D, joint faces 208A, 208B of conduit segments 204A, 204B of FIG. 2 may be perpendicular to the longitudinal axis 228 of conduit 200 as shown or may alternatively form other angles relative to the longitudinal axis, e.g., joint faces 208A, 208B may be complementarily frusto-conical in shape. In addition, joint faces may also be non-planar, e.g., having complementary mating features, e.g., interdigitating fingers.

Figure 3:
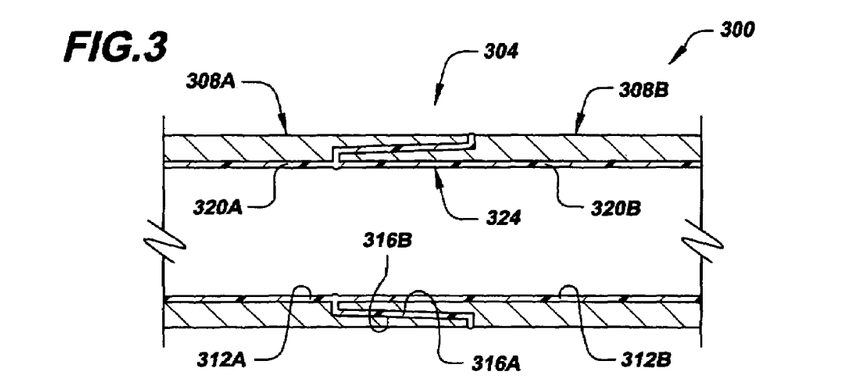
FIG. 3 is a longitudinal cross-sectional view of yet another embodiment of a conduit of the present invention.

FIG. 3 further illustrates that a conduit, such as conduit 300, of the present invention may have any of a large number of joint configurations. Unlike the butt-type joints of conduits 100, 200 as shown in FIGS. 1A and 2, respectively, conduit 300 of FIG. 3 includes a mating-type joint 304 in which conduit segment 308A has a female end that matingly receives a male end of conduit segment 308B. Prior to assembly, a lining material is secured to interior surfaces 312A, 312B and joint faces 316A, 316B of each conduit segment 308A, 308B so that each conduit segment has a corresponding segment lining 320A, 320B in a manner similar to the manner described above in connection with conduit segments 112A, 112B of FIG. 1D. Conduit 300 may be assembled by engaging the male end of conduit segment 308B with the female end of conduit segment 308A and applying a sufficient amount of heat to the portions of segment linings 320A, 320B on joint faces 316A, 316B so as to cause the segment linings to melt and at least partially fuse with one another, as described above in connection with FIG. 1C. After segment linings 320A, 320B have fused with one another, the segment linings and the fusion (not illustrated) form a monolithic lining 324.

Those skilled in the art will readily appreciate that mating-type joint 304 shown in FIG. 3 is merely illustrative of the many variations of mating-type joints, both conventional and unconventional, that may be used in connection with the present invention. Those skilled in the art will readily understand how to implement the present invention with other types of mating-type joints upon reviewing this disclosure such that it is not necessary to illustrate variations for those skilled in the art to make and use the present invention in connection with these variations.

It will also be appreciated that, other than perhaps for practicality, various dimensions of conduits made in accordance with the present invention, e.g., conduits 100, 200, 300 of FIGS. 1A, 2 and 3, respectively, are generally not limited. That said, in one application of conduits of the present invention, i.e., conduits for conveying semiconductor processing exhaust gases, the outside diameters of such conduits typically ranges from about 1 in (2.54 cm) to about 20 in (50.8 cm). It is presently anticipated, that many embodiments of conduits made in accordance with the present invention will be made of metal. Consequently, typical wall thicknesses of the bodies of the conduit segments of these embodiment will commonly, though not necessarily, fall within a range of about 0.01 in (0.254 mm) to about 0.5 in (13 mm). It is further anticipated that typical lining thicknesses will commonly, though not necessarily, fall within a range of about 1 mil (25.4 μm) to about 500 mils (12.7 mm). It is emphasized that these dimensions are merely exemplary of one application and embodiment of conduits of the present invention. Other applications and embodiments may require dimensions that are smaller or larger than the corresponding ranges just mentioned. The basic concept of the present invention may be utilized to make conduits having micro-scale dimensions as well as conduits having dimensions two or more magnitudes greater than the corresponding ranges enumerated above.

Figure 4:
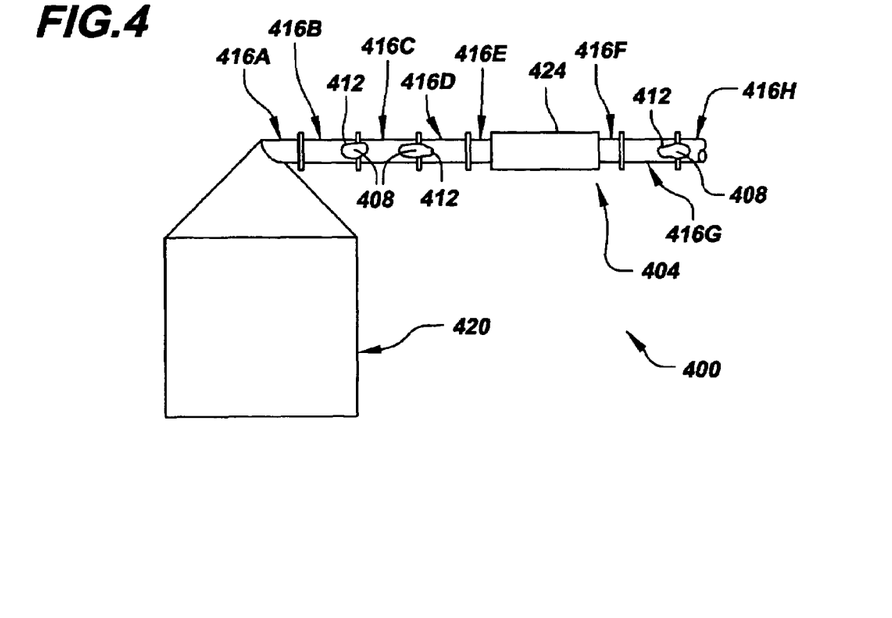
FIG. 4 is an elevational view of a system that includes a conduit of the present invention.

FIG. 4 illustrates a system 400 of the present invention that includes at least one conduit 404 having a monolithic lining 408 (as seen through cutaways 412) that is similar to monolithic linings 108, 224, 324 described above in connection with FIGS. 1A–1D, 2 and 3, respectively. That is, monolithic lining 408 comprises segment linings of each pair of abutting conduit segments 416A–416H and the fusions (not shown) formed therebetween. System 400 may include an apparatus 420 in fluid communication with conduit 404 and one or more pumping devices 424. System 400 may be any of a wide variety of systems in which it is desirable or necessary to have one or more conduits, e.g., conduit 404, each comprising a protective lining, such as monolithic lining 408. For example, system 400 may be: a system for processing an article, e.g., a semiconductor wafer, wherein apparatus 420 may be a processing chamber; a system for storing a material, wherein apparatus 420 may be a storage reservoir, tank, bin, etc.; a system for generating power, wherein apparatus 420 may be an internal combustion engine, furnace, etc.; a system for providing cooling, wherein apparatus 420 may be an evaporator, condenser, etc. Those skilled in the art will readily appreciate that the foregoing examples of system 400 are illustrative and in no way limiting. Those skilled in the art will recognize the many other systems with which the present invention may be used, such that an exhaustive list is not necessary for those skilled in the art to appreciate the broad scope of the present invention.

Pumping device 424 may be, e.g., a liquid pump, a flowable particulate pump, a gas pump, e.g., a fan, or any other device used to impart motion to the material being conveyed within conduit 404. It is noted that conduit segment 416A may be part of apparatus 420 and conduit segments 416E, 416F may be part of pumping device 424. Conduit segments 416A, 416E, 416F may be lined with a material the same as the material used for monolithic lining 408 or, alternatively, may be lined with another material or may not be lined at all. If conduit segments 416A, 416E, 416F are lined with the same material used for monolithic lining 408, they may be joined to corresponding respective adjacent conduit segments 416B, 416D, 416G using the techniques of the present invention, if desired. Alternatively, conduit segments 416A, 416E, 416F may be joined to corresponding respective adjacent conduit segments 416B, 416D, 416G by other means, e.g., mechanical joints, so as to enhance maintenance of apparatus 420 and/or pumping device 424, if needed. If conduit segments 416A, 416E, 416F are lined with a material different from the material of monolithic lining 408 or are unlined, these segments will likely need to be joined to adjacent conduit segments 416B, 416D, 416G using techniques other than the techniques of the present invention. Conduit 404 may be of any type, such as an inlet conduit, an outlet conduit, a recycling conduit, etc. Adjacent conduit segments 416A–416H may have virtually any configuration in the manner described above in connection with FIGS. 1A–1D, 2 and 3.

Figure 5:
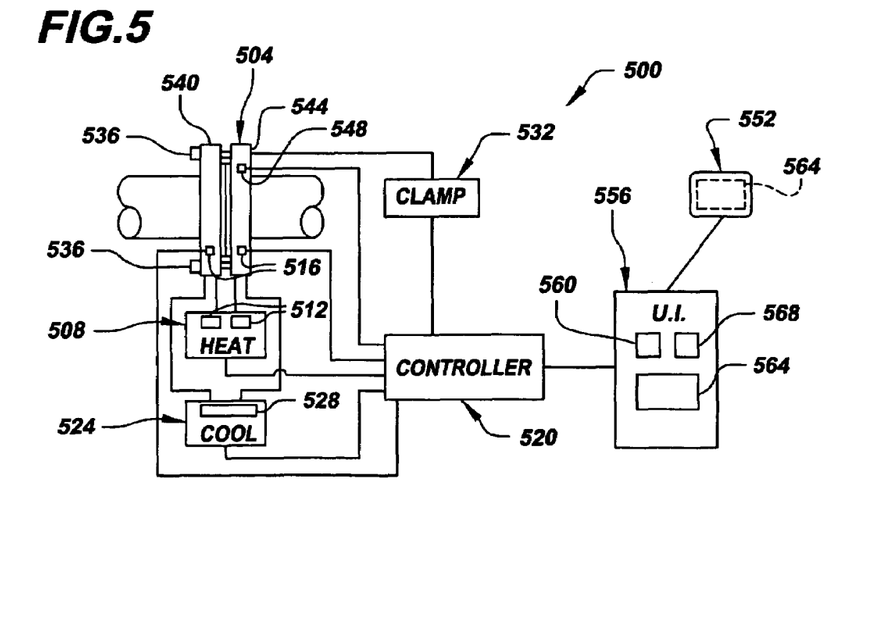
FIG. 5 is a high-level schematic diagram of a joint forming system of the present invention.

Referring now to FIG. 5, and also to FIG. 1D, FIG. 5 illustrates generally a joint forming system 500 of the present invention that may be used, e.g., to create fusions 148A, 148B (FIG. 1C) between segment linings 136A–136C of adjacent conduit segments 112A–112C so as to create monolithic lining 108. Joint forming system 500, in a basic form, may comprise a joining head 504 and a heating system 508 that applies via the joining head heat to portions 140A–140C of segment linings 136A–136C present on joint faces 132A–132C. Joining head 504 may have any configuration needed to suit the configuration of conduit segments, e.g., conduit segments 112A–112C to be joined. FIG. 5 illustrates joining head 504 being configured for use with conduit segments having flanges, e.g., flanges 128A–128C. In this case, joining head 504 may be configured so as to apply heat to portions 140A–140C of segment linings 136A–136C through flanges 128A–128C. Joining head 504 for another joint configuration, e.g., the joint configurations illustrated in FIGS. 2 and 3, will typically have a different configuration designed to suit the configuration of the corresponding joint. For example, relative to the joint configuration shown in FIG. 2, joining head 504 may be configured to engage conduit 200 circumferentially about the joint and apply heat to portions of the conduit immediately adjacent joint faces 208A, 208B. Relative to joint 304 shown in FIG. 3, joining head 504 may be configured to engage conduit 300 circumferentially along the longitudinal length of the conduit corresponding with the joint and apply heat to the conduit along at least this length. Those skilled in the art will readily understand how to adapt joining head 504 to the joint configuration at issue.

Heating system 508 may be any type of system that includes one or more heaters 512 having the capability of heating portions 140A–140C of segment linings 436A–436C between joint faces 132A–132C to the appropriate temperature that allows the corresponding fusion 148A, 148B to form. Heater(s) 512 may be located aboard joining head 504, e.g., in the case of resistance-type heaters, radio-frequency heaters, infrared heaters and microwave heaters, among others, or may be located off-board of the joining head and in thermal communication with the joining head via some sort of thermal link, such as a heating-type fluid link. Those skilled in the art will understand how to select the type of heater(s) 512 suitable for the joint configuration and lining material at hand. It is noted that joining head 504 and heating system 508 may be configured to heat corresponding respective portions 140A–140C of segment linings 136A–136C separately relative to one another so as to effect substantially uniform heating of both portions. This may be desirable especially in cases wherein the thermal masses, e.g., flanges 128A–128C, are different from one another and would heat at different rates in the absence of separate heating. In this connection, heating system 508 may include temperature sensors 516 for sensing temperatures on each side of joint 116A, 116B at issue. The separate heaters 512 may then be controlled separately to apply heat to the two sides as needed to maintain the temperatures on both sides within a predetermined differential relative to one another, e.g., 5° F. In one embodiment having separately-controlled resistance-type heaters 512, the cycling of the heaters may be actuated via corresponding respective silicon controlled rectifiers (SCRs) (not shown). Of course, if only one heater 512 is used, joining head 504 may include only one or more temperature sensors 516 for sensing when corresponding respective joint 116A, 116B overall has reached the appropriate temperature at which the respective fusion 148A, 148B is formed.

Joint forming system 500 may optionally include a controller 520 that may be operatively configured for automatically controlling heating system 508. For example, if only the temperature of the entire joint 116A, 116B is sensed, controller 520 may be programmed with a setpoint corresponding to the desired fusion temperature. Controller 520 may then be programmed to operate heater(s) 512 until the set point is reached. Optionally, if it is desired to hold a temperature (soak temperature) for a predetermined amount of time (soak period), controller 520 may be programmed to cycle heater(s) 512 so as to substantially maintain the soak temperature for the soak period. The soak period may be any duration suitable for a particular application. In one embodiment, soak periods were made selectable within a range of 0–15 minutes. If the sides of corresponding respective joints 116A, 116B are heated separately, heater(s) 512 for each side may be controlled in a similar manner using temperature information from the respective sides. Controller 520 may also be programmed to keep the two sides of joint 116A, 116B at substantially the same temperature during heating and soaking as described above. Those skilled in the art will readily understand how to program controller 520 to control heating system 508 in a manner, such as the manners just discussed, appropriate to form corresponding fusions 148A, 148B and, consequently, monolithic lining 108 (FIG. 1C). Controller 520 may be any suitable type of software, hardware or software/hardware controller and may utilize any suitable sort of control scheme, such as a proportional/integral/derivative (PID) control scheme, among others. For example, controller 512 may be implemented in a general-purpose computer, an application specific computer and a programmable logic controller (PLC), among others.

Joint forming system 500 may also optionally include a cooling system 524 for relatively rapidly cooling each fusion 148A, 148B, surrounding portions of conduit 100 after that fusion has been formed, and/or joining head 504. In many cases, rapid cooling may be desired so that conduit 100 and/or joining head 504 may be handled soon after the corresponding fusion 148A, 148B has been formed. This allows a user to form another joint more quickly than if the just-heated joint and/or forming head 504 were permitted to cool without additional cooling. Relatively short joint-forming times are often desirable from production and cost efficiency points of view. Cooling system 524 may include any suitable type of cooler(s) 528 for cooling conduit 100 from its fusion/soak temperature to a desired temperature, e.g., a handling temperature. For example, cooling system 528 may be a fluid-type cooling system 524 that uses a fluid, e.g., a liquid (e.g., an oil or a glycol), a gas (e.g., compressed air) or a two-state fluid, to transfer heat from conduit 100 to a heat sink (not shown), e.g., a radiator, condenser, storage reservoir, etc. Alternatively, cooling system 524 may be another type of cooling system, such as a thermoelectric cooling system. Generally, but not necessarily, if cooling system 524 is a fluid-type cooling system, some components of the system may need to be located off-board of joining head 504. The sizing of cooling system 504 will generally require consideration of the temperatures involved, the rapidness of cooling and the cycle time between the formation of successive joints.

If cooling system 524 is provided, controller 520 may be programmed to automatically operate the cooling system in conjunction with heating system 508. For example, controller 520 may be programmed to start cooling system 524 at an appropriate time, e.g. immediately following the soak period or reaching the predetermined fusion temperature, depending upon the cooling needs. Cooling system 524 may also be used in controlling the temperature of the corresponding joint 116A, 116B during fusion and/or soak period, if needed. Controller 520 may also be programmed to shut down cooling system 524 once a predetermined temperature that has been programmed into the controller has been reached, as determined via temperature sensor(s) 516.

Joint forming system 500 may further optionally include a clamping system 532 for pressing and/or moving corresponding conduit segments 112A–112C toward one another prior to, during and/or after the respective fusion 148A, 148B is formed. Clamping system 532 may include one or more hand-actuated or automatically-actuated clamping devices 536 for clamping respective conduit segments 112A–112C to one another. For example, joining head 504 may comprise two primary parts separate, and spaced, from one another, one engaging one of conduit segments 112A, 112B and the other engaging the respective other conduit segment 112B, 112C. Clamping device(s) 536 may extend between the primary parts 540, 544 and draw them together during actuation. When conduit segments 112A, 112C include flanges 128A–128C as shown, primary parts 540, 544 may engage corresponding respective flanges 128A–128C so as to apply the drawing force needed. With flangeless conduit segments, such as conduit segments 204A, 204B, 308A, 308B shown in FIGS. 2 and 3, respectively, each primary part 540, 544 may include a gripper (not shown) that grips the corresponding respective conduit segment so that they may be clamped to one another.

Clamping device(s) 536 may be any type of device, such as a screw-, hydraulic-, pneumatic-, wedge-, lever-, magnetic-, spring- and/or reel-type device, among many others, capable of clamping conduit segments 112A–112C against one another. In an alternative joining head (not shown), the joining head may include a frame having two conduit-engaging members, one member for engaging one conduit segment and the other member for engaging another conduit segment. At least one of the two conduit-engaging members may be made movable relative to the frame via one or more clamping devices so that the conduit segments may be clamped to one another, with the opposing clamping forces being transmitted through the frame and joint, respectively. Depending upon the type of clamping device(s) used, clamping system 532 may be located partially or completely onboard joining head 504.

If clamping system 532 is provided, and it is automatically controllable, controller 520 may be programmed to control the clamping force applied between respective conduit segments 112A–112C, the displacement of the conduit segments during formation of the corresponding fusion 148A, 148B or both. Accordingly, clamping system 532 may be provided with one or more appropriate sensors 548, e.g., a pressure sensor and/or displacement sensors, that provide controller 520 with information needed to control the clamping system. In addition, clamping system 532 may be controlled in concert with heating system 508. The choice of whether to control the pressure, relative displacement or both may be a function of a number of factors, e.g., the materials used for segment linings 136A–136C and the thicknesses of the segment linings applied to joint faces 132A–132C. For example, in one embodiment of joint forming system 500 it may be desirable to control clamping system 532 to apply a predetermined clamping pressure between abutting conduit segments 112A–112C and then heat respective portions 140A–140C of segment linings 136A–136C to the appropriate fusion temperature without any further control of the clamping system, other than, e.g., to relieve clamping devices 536 after cooling so that joining head 504 may be removed from conduit 100, or vice versa. In another embodiment of joint forming system 500 it may be desirable to essentially not apply any pressure initially and then, once respective portions 140A–140C of segment linings 136A–136C have been heated sufficiently, displace corresponding joint faces 132A–132C toward one another by a predetermined amount and hold the corresponding conduit segments 112A–112C in this displaced position until that fusion 148A, 148B cools. For example, if each of portions 140A–140C of segment linings 136A–136C between joint faces 132A–132C is 1 mm thick such that the joint faces are spaced apart 2 mm when these portions are initially brought into contact with one another, it may be desirable to decrease the spacing $S_A$, $S_B$ between the joint faces by 25%, or 0.5 mm, once the portions have softened. Joint forming system 500 may then hold the respective ones conduit segments 112A–112C steady at this reduced spacing until the corresponding fusion 148A, 148B cools.

Joint forming system 500 may include a display 552 and a user interface 556, e.g., a graphical user interface (GUI) or line-command interface, or both, that may be operatively configured to provide one or more of a variety of functions. For example, user interface 556 may include a programming module 560 that allows a user: to input data, e.g., one or more temperature setpoints, pressure setpoints and displacement setpoints; to change control parameters, e.g., loop gains, operating speeds, etc.; and/or to modify the program (s) that controller 520 runs so as to effect the desired control scheme. User interface may also include a control panel 564, either physical or simulated on display 552, or both, which allows a user to control the overall functioning of joint forming system 500. For example, control panel 564 may include joint-formation start, stop, interrupt, and resume controls, as well as any of a host of other controls, e.g., alarm, display, testing/verification, and system startup and shutdown controls, among others. Those skilled in the art will be readily familiar with the various types of system and function controls that may be implemented in user interface 556, such that an exhaustive list need not be provided nor described in detail for those skilled in the art to make and use the present invention to its fullest scope.

User interface 556 may also include a presentation module 568 operatively configured to present to a user, e.g., via display 552, setpoints, operating parameters and information regarding the functioning of joint forming system 500 during operation, among other things. Functioning information may include, among other things, plots and/or numeric display of temperature(s), pressure(s) and/or displacements (s) over the joint-forming cycle, plots and/or numeric display relating to the duty cycles of the heater(s), cooler(s) and/or clamping device(s), as well as information regarding any critical parameters of any of heating system, cooling system and clamping system, such as fluid levels and operating temperatures and pressures, among others. Those skilled in the art will readily appreciate the variety of information that may be desirable to display to a user via user interface 556.

EXAMPLE

In this example, two flanged conduit segments similar to conduit segments 112A, 112B and 112B, 112C shown in FIGS. 1A–1D and 5, were joined to one another as described above so as to create a conduit having a monolithic lining. Accordingly, the conduit of this example is described using the element names and numerals shown in these figures. However, it is emphasized that the particulars, e.g., dimensions and materials, of this example are in no way intended to limit the embodiment shown in FIGS. 1A–1D and 5. Rather, the particulars presented below are merely illustrative of sample conduits that the inventors have prepared.

In this example, conduit 100 was particularly designed for application as an exhaust gas duct for exhausting gases from conventional semiconductor wafer CVD chambers. Gases exhausted from such chambers may contain silane, arsine, hydrofluoric acid, sulfuric acid and nitric acid, among others, and are typically at a temperature of about 65° F. to about 300° F. or more. These gases, in combination with such temperatures, have characteristics detrimental to ordinary metal ducts. It has been found that a number of materials, especially fluoropolymers, are resistant to these detrimental characteristics. Lining ordinary metal ducts with a fluoropolymer lining has been found to be a cost-effective solution to providing exhaust gas ducts to the semiconductor fabrication industry. Examples of fluoropolymers presently used by a number of duct manufacturers are ETFE, e.g., TEFZEL® ETFE, available from E.I. Du Pont de Nemours and Company, Wilmington, Del., and ECTFE, e.g., HALAR® ECTFE, available from Solvay Solexis, Thorofare, N.J.

Referring to FIGS. 1A–1D, body 120A–120C of each conduit segment 112A–112C was made of stainless steel and comprised a wall forming a cylinder having an 8.25 in (20.96 cm) inside diameter. Each wall and flange 128A–128C, which was formed integrally with the corresponding respective wall, had a thickness of 0.032 in (0.813 mm). Each flange 128A–128C extended beyond the outer circumferential surface of the corresponding wall by 0.3125 in (7.938 mm). Each segment lining 136A–136C was made of ETFE and had a thickness on the corresponding respective interior surface 124A–124C of about 6–8 mils (152–203 µm) and about 12–16 mils (305–406 µm) on the joint faces 132A–132C. The particular ETFE used was TEFZEL® ETFE, mentioned above. Each segment lining 136A–136C was applied to the corresponding body 120A–120C using well-known techniques in which a primer 144 was applied to the corresponding body in a thickness of about 2–3 mils (51–76 µm) and the ETFE was then electrostatically applied over the primer and baked at a temperature of about 600° F. As seen, the thickness of each segment lining 136A–136C on the corresponding joint faces 132A–132C was about twice the thickness of the segment lining on interior surfaces 124A–124C. This was accomplished simply by double spraying the ETFE onto flanges 128A–128C. In this example, the double-thickness layer of segment linings 136A–136C on joint faces 132A–132C was intended to provide additional lining material to account for any out-of-planeness present on the joint faces. Some designs may require the thickness of segment linings 136A–136C on joint faces 132A–132C to be greater than twice the thickness of the segment linings on interior surfaces 124A–124C or less than twice the thickness of the segment linings on the interior surfaces. In some designs, it may even be desirable that the thickness of segment linings 136A–136C on joint faces 132A–132C to be less than the thickness of the segment linings on interior surfaces 124A–124C.

Figure 6A:
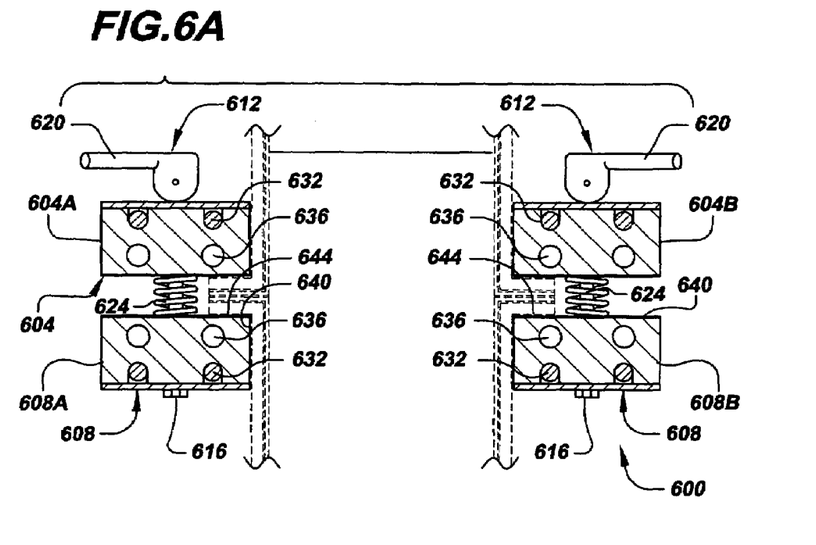
FIG. 6A is a cross-sectional view of a joining head suitable for use with joint forming system of FIG. 5.
Figure 6B:
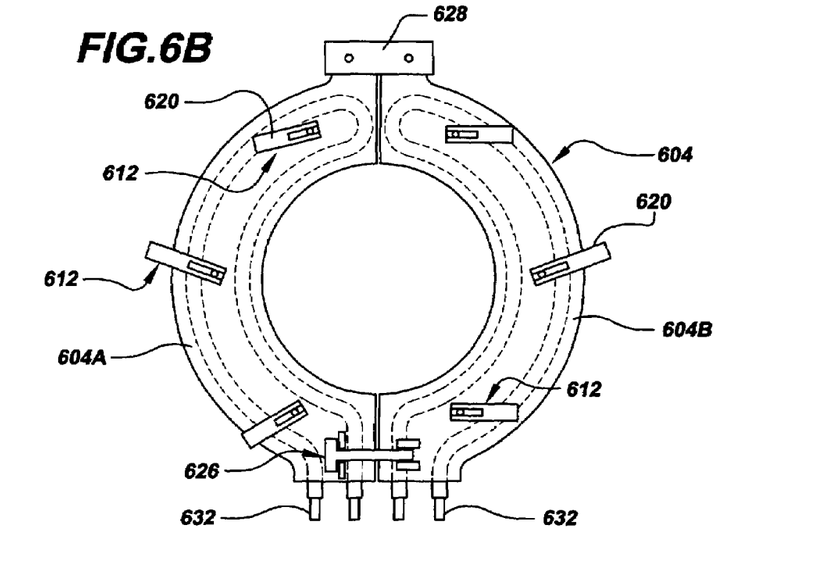
FIG. 6B is a reduced plan view of the joining head of FIG. 6A.

After conduit segments 112A–112C cooled to room temperature, they were placed end-to-end with one another so that corresponding joint faces 132A–132C faced one another and portions 140A–140C of segment linings 136A–136C on flanges 128A–128C contacted one another. Then, joining head 600 of FIGS. 6A and 6B was engaged with the two duct segments. Referring to FIGS. 5, 6A and 6B, as seen in FIGS. 6A and 6B, joining head 600 generally included two rings 604, 608, one for engaging the flange of one duct segment and the other engaging the adjacent flange of another duct segment. Rings 604, 608 were secured to one another by mechanical clamp 612, which generally comprised threaded shoulder bolts 616 and pivoting compression locks 620. Springs 624 extended between rings 604, 608 to keep the rings spaced apart while engaging joining head 600 with the conduit segments and to assist in spreading the rings apart once the corresponding joint, e.g., joint 116A or joint 116B, has been formed. Each ring 604, 608 comprised two semi-circular halves 604A, 604B, 608A, 608B pivotably secured to one another via a hinge 628 so that joining head 600 could be easily engaged with the duct segments. A latch 626 was used to secure joining head 600 about the duct segments. Once joining head 600 was properly positioned relative to the duct segments, rings 604, 608 were clamped to one another by actuating compression locks 620 so that the rings pressed respective portions 140A–140C (FIG. 1D) of segment linings 136A–136C against one another.

Each ring 604, 608 included two resistance-type heating elements 632, one for each half 604A, 604B, 608A, 608B, and two coolant passageways 636. Heating elements 632 of ring 604 were controlled by controller 520 separately from the heating elements of ring 608 so that heating of each portion 140A–140C (FIG. 1D) could be performed in step with the heating of the corresponding other portion. Once joining head 600 was properly engaged with the duct segments, heating was started. The particular ETFE used in this example had a melting point temperature of 550° F. and became flowable at about 590–600° F. Based on these temperatures, a setpoint of 580° F. was entered into controller 520. Consequently, controller 520 actuated heating elements 632 until the setpoint temperature was reached. In this example, the soak period, which was also entered into controller 520, was three minutes. Once soak period ended, controller 520 activated cooling system 524 to cool conduit 100 to a suitable handling temperature, in this example, 150° F. Accordingly, this 150° F. temperature was input into controller 520 as a setpoint identifying at which temperature the controller is to stop cooling system 524.

During the time the temperature of respective portions 140A–140C (FIG. 1D) of segment linings 136A–136C were above 550° F., i.e., the melting temperature of the ETFE, the corresponding fusion 148A, 148B, (FIG. 1C) and, consequently monolithic lining 108, were being formed. It is noted that during formation of each fusion 148A, 148B, some of the material of segment linings 136A–136C may be squeezed out of the space between joint faces 132A–132C, particularly if the pressure applied by joining head 600 is relatively large and/or the lining material becomes readily flowable. When this happens, some of the lining materials may contact one or both inner surfaces 640 of rings 604, 608. Depending on the material defining surfaces 640, the lining material may adhere to these surfaces, causing difficulty in opening joining head 600 and removing conduit 100 and causing cleaning problems. Consequently, the present inventors have found it beneficial to coat inner surfaces 640 with an anti-stick coating 644, which in the present example comprised PFA.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A conduit, comprising:
   a) a first conduit segment comprising:
      i) a first body having a first interior surface and a first joint face; and
      ii) a first layer of a first lining material secured to said first interior surface and to said first joint face;
   b) a second conduit segment comprising:
      i) a second body having a second interior surface and a second joint face facing said first joint face and spaced therefrom by a distance so as to form an interfacial space substantially coextensive with at least one of said first and second joint faces; and
      ii) a second layer of a second lining material secured to said second interior surface and to said second joint face;
   wherein said first lining material and said second lining material each extend into said interfacial space; and
   c) a fusion having at least a portion formed from said first lining material secured to said first joint face and from said second lining material secured to said second joint face so as to form a fused interfacial mass consisting of all of said first lining material located in said interfacial space and all of said second lining material located in said interfacial space, said fused interfacial mass having a solid thickness between said first and second joint faces, said solid thickness consisting only of said first lining material and said second lining material throughout said fused interfacial mass, said fused interfacial mass being monolithic with each of said first layer and said second layer.

2. A structure according to claim 1, wherein each of said first and second layers comprises a thermoplastic.

3. A conduit according to claim 2, wherein said thermoplastic comprises a fluoropolymer.

4. A conduit according to claim 3, wherein said fluoropolymer is an ethylene tetrafluoroethylene.

5. A conduit according to claim 1, wherein each of said first and second layers is secured to the corresponding respective one of said first and second interior surface via a primer.

6. A conduit according to claim 1, wherein said first conduit segment includes a first flange and said second conduit segment includes a second flange, said fists joint face being at least partially contained on said first flange and said second joint face being at least partially contained on said second flange.

7. A conduit according to claim 6, wherein each of said first and second joint faces substantially defines a plane that is perpendicular to each of said first and second interior surfaces.

8. A conduit according to claim 1, wherein each of said first and second bodies are made of metal.

9. A conduit according to claim 1, wherein each of said first and second conduit segments are closed conduit segments.

10. A conduit according to claim 9, wherein each of said first and second conduit segments has a substantially circular transverse cross-section.

11. A conduit according to claim 10, wherein said circular transverse cross-section has an outside diameter from about 1 in (2.54 cm) to about 20 in (50.8 cm).

12. A conduit according to claim 1, wherein said body comprises a wall having a thickness of about 0.01 in (0.254 mm) to about 0.5 in (13 mm).

13. A conduit according to claim 1, wherein each of said first and second layers has a thickness of about 1 mil (25.4 μm) to about 500 mils (12.7 mm).

14. A structure according to claim 1, wherein each of said first layer and said second layer is a coating.

15. A structure according to claim 1, wherein each of said first layer and said second layer has a thickness of less than about 130 mils.

16. A structure according to claim 1, wherein said first lining material is bonded to each of said first interior surface and said first joint face and said second lining material is bonded to each of said second interior surface and said second joint face.

17. A structure according to claim 1, wherein said first conduit segment is structurally connected to said second conduit segment solely by said fusion.

\* \* \* \* \*

UNITED STATES PATENT AND TRADEMARK OFFICE
CERTIFICATE OF CORRECTION

PATENT NO.         : 7,264,279 B2                                    Page 1 of 1
APPLICATION NO.    : 10/887560
DATED              : September 4, 2007
INVENTOR(S)        : Rich et al.

It is certified that error appears in the above-identified patent and that said Letters Patent is hereby corrected as shown below:

The title page item (75) Inventors:
    Delete ; Robert J. Moore, II, Westford, VT (US)

Signed and Sealed this

Twenty-first Day of October, 2008

JON W. DUDAS
*Director of the United States Patent and Trademark Office*